United States Patent
Li et al.

(10) Patent No.: US 9,300,717 B2
(45) Date of Patent: Mar. 29, 2016

(54) INFORMATION TRANSMISSION METHOD AND SYSTEM, AND BROWSER ON MOBILE TERMINAL

(75) Inventors: Liang Li, Nanjing (CN); Yang He, Shenzhen (CN); Zhifeng Liu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 189 days.

(21) Appl. No.: 13/567,508

(22) Filed: Aug. 6, 2012

(65) Prior Publication Data
US 2013/0066983 A1    Mar. 14, 2013

Related U.S. Application Data

(63) Continuation of application No. PCT/CN2012/074495, filed on Apr. 23, 2012.

(30) Foreign Application Priority Data

Sep. 14, 2011  (CN) .......................... 2011 1 0271814

(51) Int. Cl.
| G06F 17/16 | (2006.01) |
| H04L 29/08 | (2006.01) |
| H04W 4/12 | (2009.01) |

(52) U.S. Cl.
CPC .............. *H04L 67/02* (2013.01); *H04L 67/145* (2013.01); *H04L 67/2842* (2013.01); *H04L 67/2861* (2013.01); *H04W 4/12* (2013.01)

(58) Field of Classification Search
CPC ....................................................... G06F 15/16
USPC ........................................................ 709/206
See application file for complete search history.

(56) References Cited

U.S. PATENT DOCUMENTS

| 2009/0043849 | A1 | 2/2009 | Blackburn et al. |
| 2011/0287739 | A1* | 11/2011 | Cajigas Bringas et al. ... 455/410 |
| 2012/0026992 | A1* | 2/2012 | Navda et al. .................. 370/338 |
| 2012/0216133 | A1* | 8/2012 | Barker et al. ................. 715/760 |
| 2013/0173800 | A1* | 7/2013 | Okuyama et al. ............. 709/225 |

FOREIGN PATENT DOCUMENTS

| CN | 101163114 | 4/2008 |
| CN | 101599982 | 12/2009 |
| CN | 102045369 | 5/2011 |
| CN | 102413436 | 4/2012 |
| EP | 1353270 A2 | 10/2003 |

OTHER PUBLICATIONS

Partial Translation and English Abstract of CN 102045369 (Ref. AH in the IDS filed Sep. 20, 2012).
Partial Translation and English Abstract of CN 101599982 (Ref. AJ in the IDS filed Sep. 20, 2012).
International Search Report issued Aug. 2, 2012 in corresponding International Patent Application No. PCT/CN2012/074495.
Extended European Search Report dated Sep. 11, 2014 in related European Patent Application No. 12793329.9 (6 pages).

\* cited by examiner

*Primary Examiner* — David Lazaro
*Assistant Examiner* — Zia Khurshid
(74) *Attorney, Agent, or Firm* — Staas & Halsey LLP

(57) ABSTRACT

The present invention discloses an information transmission method and system, and a browser on a mobile terminal, and belongs to the field of the mobile Internet. Through the technical solutions of the present invention, an entire information transmission procedure does not require cooperation of an operator and a process having a specific function to be embedded, so that the information transmission procedure is simplified.

16 Claims, 9 Drawing Sheets

INFORMATION TRANSMISSION METHOD AND SYSTEM, AND BROWSER ON MOBILE TERMINAL

CROSS-REFERENCE TO RELATED APPLICATIONS

This application is a continuation of International Application No. PCT/CN2012/074495, filed on Apr. 23, 2012, which claims priority to Chinese Patent Application No. 201110271814.5, filed on Sep. 14, 2011, both of which are hereby incorporated by reference in their entireties.

FIELD OF THE INVENTION

The present invention relates to the field of the mobile Internet, and in particular, to an information transmission method and system, and a browser on a mobile terminal.

BACKGROUND OF THE INVENTION

With the development of a mobile Internet technology, a push mail (Push Mail) technology appears at present. The technology can rapidly push a new mail that is just reached by a mailbox of a user to a user terminal at the very earliest moment. A user may receive, send, and process mails anywhere and anytime without frequently logging in to the mailbox on the Internet, which is significantly convenient for the user.

A procedure of implementing the push mail technology is specifically that: Upon receiving a new mail, a server first notifies a mobile operator that a user has a new mail, and the mobile operator starts a process on a terminal of the user through a hidden short message. The process accesses a data network and receives the mail. In this way, the user may receive, send, and process mails anywhere and anytime without frequently logging in to the mailbox on the Internet. The process of implementing a push mail procedure in the prior art requires participation of the mobile operator and also requires the user terminal to be embedded with a process having a specific function, and the implementation is relatively complicated.

SUMMARY OF THE INVENTION

To avoid participation of an operator and embedding of a process having a specific function in an information transmission procedure and simplify the information transmission procedure, embodiments of the present invention provide an information transmission method and system, and a browser on a mobile terminal. The technical solutions are as follows.

An information transmission method includes:

obtaining, by a browser plug-in on a personal computer and a browser on a mobile terminal, an address of a cloud server from an address server respectively, and logging in to the cloud server corresponding to the address;

sending, after the browser plug-in on the personal computer successfully logs in to the cloud server, a message content record of a user to the cloud server; and pushing, by the cloud server, after the browser on the mobile terminal successfully logs in to the cloud server, the message content record to the browser on the mobile terminal actively through a persistent HTTP connection with the browser on the mobile terminal, or, pulling, by the browser on the mobile terminal, the message content record from the cloud server regularly and actively.

An information transmission system includes: a browser plug-in on a personal computer, a browser on a mobile terminal, and a cloud server, where the browser plug-in on the personal computer and the browser on the mobile terminal respectively obtain an address of the cloud server from an address server, and log in to the cloud server corresponding to the address;

after successfully logging in to the cloud server, the browser plug-in on the personal computer sends a message content record of a user to the cloud server; and after the browser on the mobile terminal successfully logs in to the cloud server, the cloud server pushes the message content record to the browser on the mobile terminal actively through a persistent HTTP connection with the browser on the mobile terminal, or, the browser on the mobile terminal pulls the message content record from the cloud server regularly and actively.

A browser on a mobile terminal includes:

a login module, configured to obtain an address of a cloud server from an address server, and log in to the cloud server corresponding to the address; and an information obtaining module, configured to receive in real time, after successfully logging in to the cloud server, through a persistent HTTP connection with the cloud server, a message content record which is sent by a browser plug-in on a personal computer and is actively pushed by the cloud server, or, pull the message content record from the cloud server regularly and actively.

A beneficial effect brought by the technical solutions provided in the embodiments of the present invention is that: the browser plug-in on the personal computer and the browser on the mobile terminal respectively obtain the address of the cloud server from the address server, and log in to the cloud server corresponding to the address, and after successfully logging in to the cloud server, the browser plug-in on the personal computer sends the message content record of the user to the cloud server, and after the browser on the mobile terminal logs in to the cloud server successfully, the cloud server actively pushes the message content record to the browser on the mobile terminal through the persistent HTTP connection with the browser on the mobile terminal, or, the browser on the mobile terminal pulls the message content record from the cloud server regularly and actively. The entire information transmission procedure does not require cooperation of the operator and the process having a specific function to be embedded, so the information transmission procedure is simplified.

BRIEF DESCRIPTION OF THE DRAWINGS

To illustrate the technical solutions in the embodiments of the present invention or in the prior art more clearly, accompanying drawings that is required to be used in the description of the present invention or the prior art are briefly introduced below. Obviously, the accompanying drawings in the following description are merely some embodiments of the present invention. Persons of ordinary skill in the art may obtain other drawings based on these accompanying drawings without making creative efforts.

DETAILED DESCRIPTION OF THE EMBODIMENTS

To make the objectives, technical solutions, and advantages of the present invention more clear, the embodiments of the present invention are further described in the following in detail with reference to the accompanying drawings.

Embodiment 1

This embodiment provides an information transmission method, where the method involves a PC (Personal Computer, personal computer), a cloud server, and a mobile terminal. A browser plug-in is installed on the PC. A browser is installed on the mobile terminal. The browser plug-in serves as an HTTP (Hyper Text Transfer Protocol, hyper text transfer protocol) client on the PC, the browser serves as an HTTP client on the mobile terminal, and the cloud server serves as an HTTP server for bridging the PC and the mobile terminal. The browser plug-in on the PC may be oriented to various mainstream browsers such as IE, Firefox, and Chrome.

Figure 1:
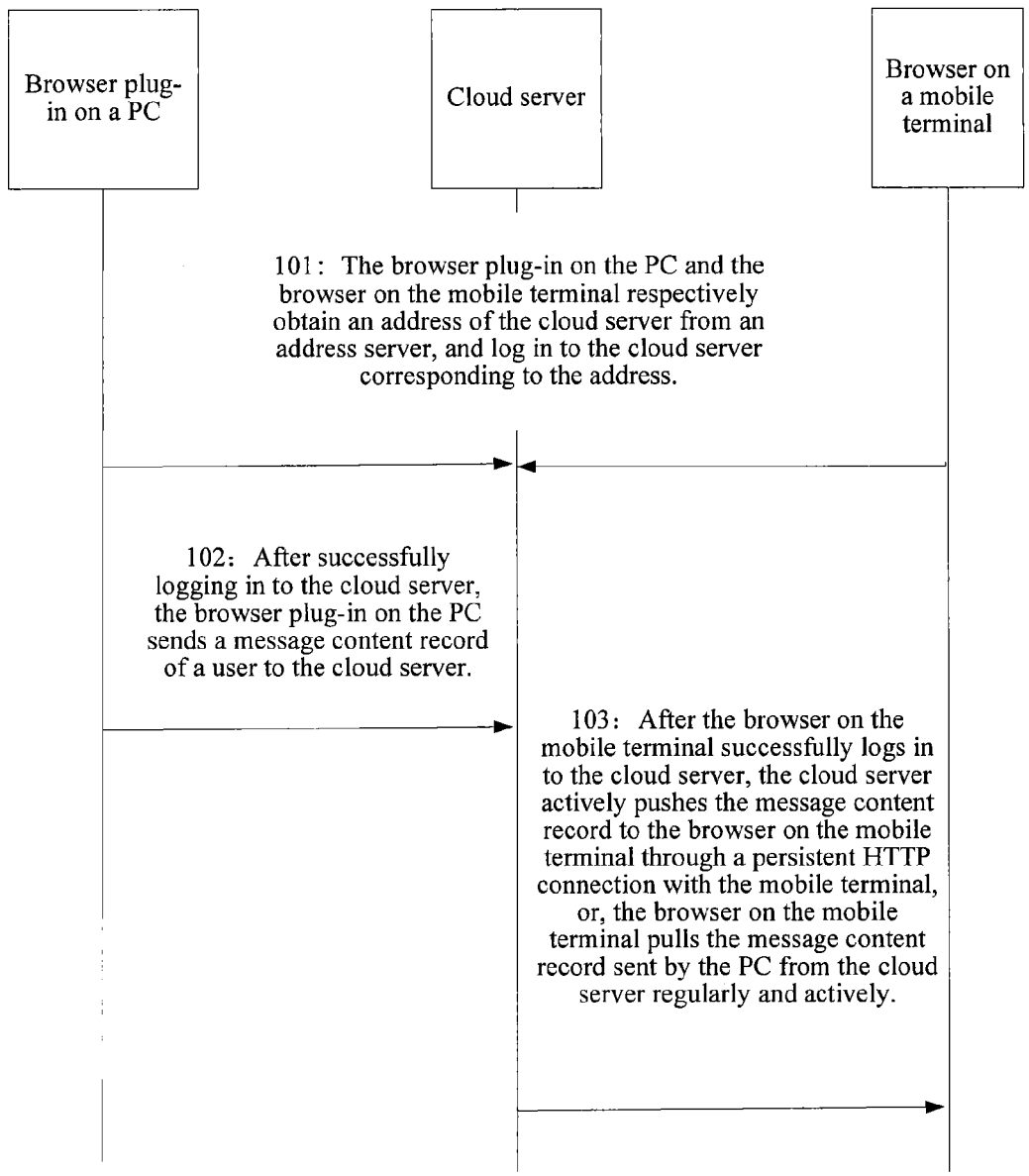
FIG. 1 is a flow chart of an information transmission method according to Embodiment 1 of the present invention.

Referring to FIG. 1, a procedure of the information transmission method is as follows.

101: A browser plug-in on a PC and a browser on a mobile terminal respectively obtain an address of a cloud server from an address server, and log in to the cloud server corresponding to the address.

According to a login sequence, the logging in to the cloud server includes the following two cases.

In a first case, the browser plug-in on the PC first obtains the address of the cloud server from the address server, and logs in to the cloud server corresponding to the address, and the browser on the mobile terminal then obtains the address of the cloud server from the address server, and logs in to the cloud server corresponding to the address.

Figure 2A:
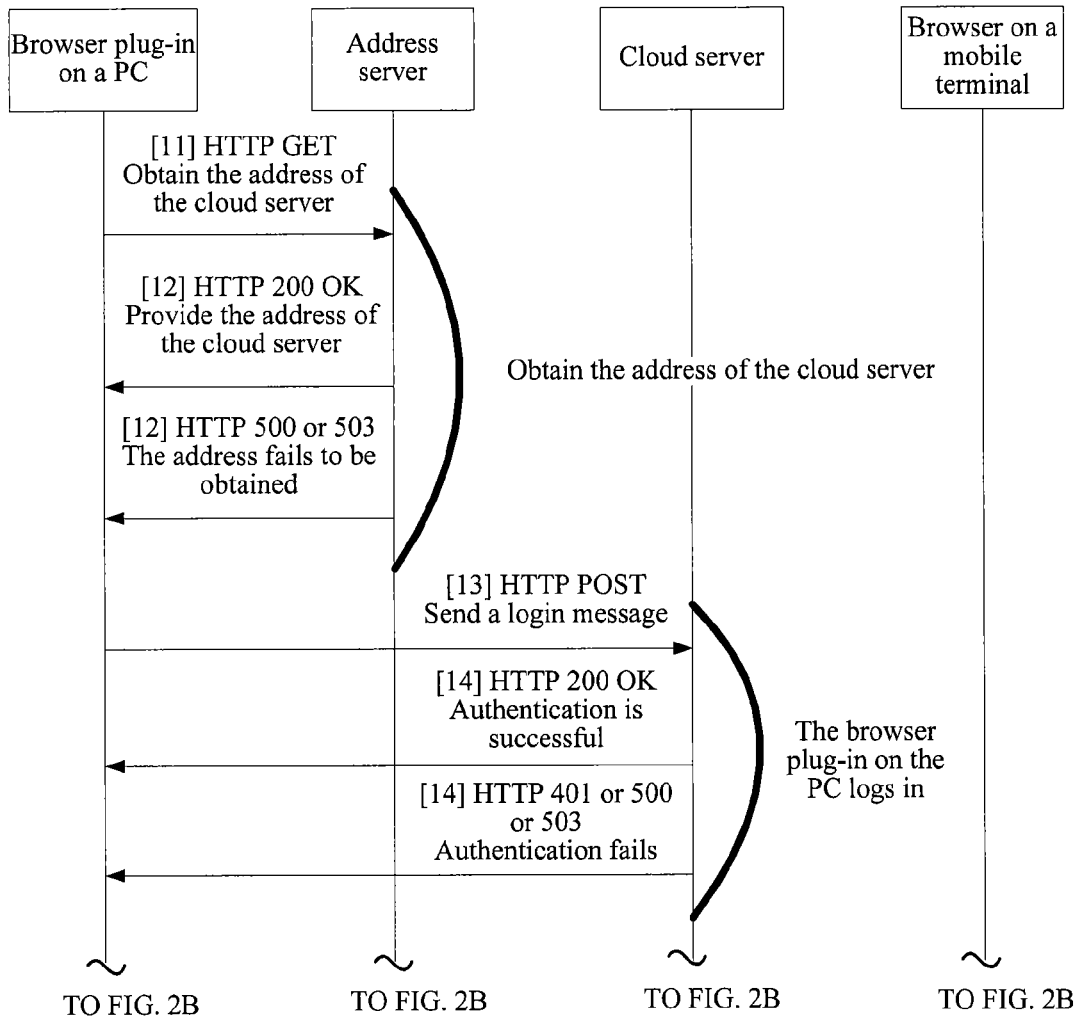
FIGS. 2A and 2B is an information interaction diagram of logging in to a cloud server according to in Embodiment 1 of the present invention.
Figure 2B:
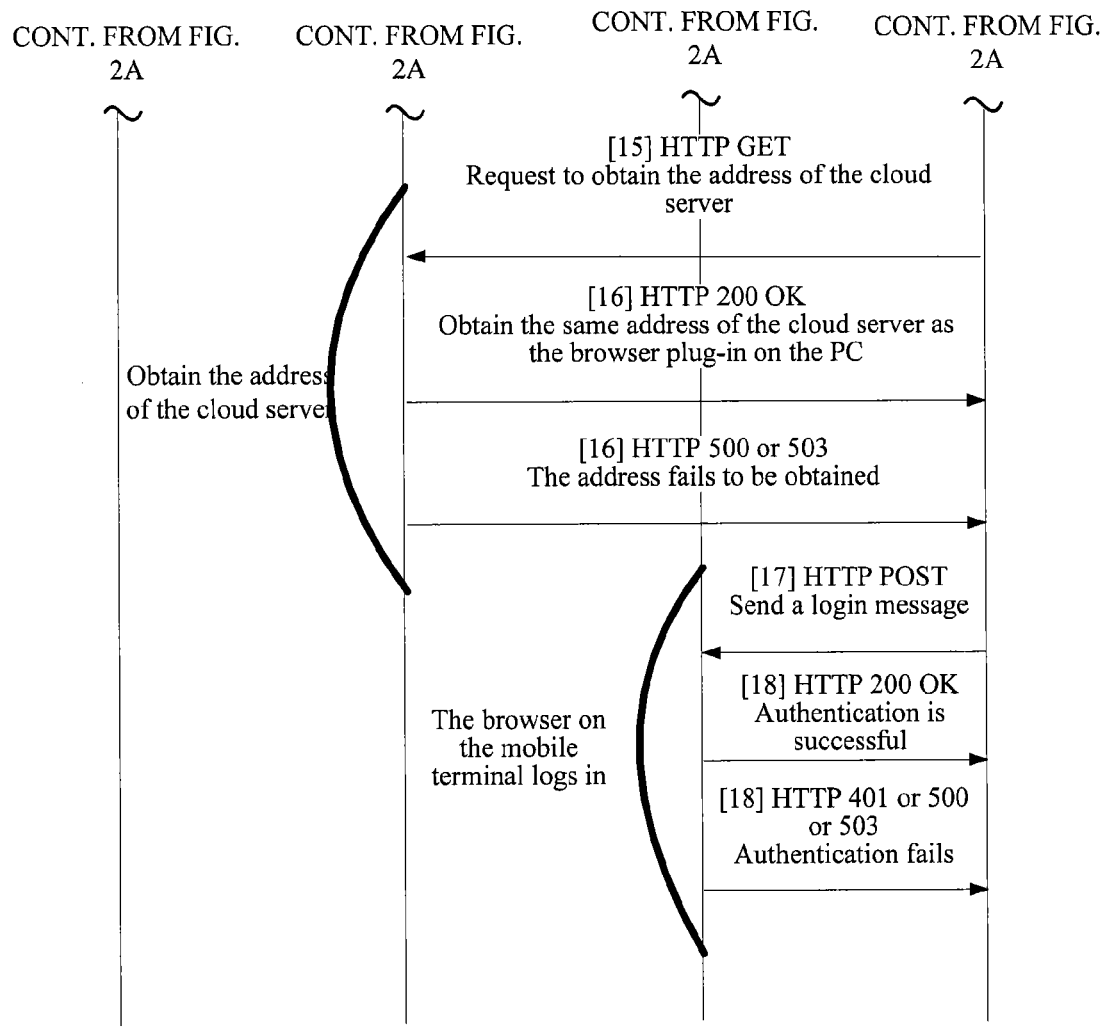

Referring to FIG. 2, a specific procedure is as follows.

[11] The browser plug-in on the PC requests to obtain the address of the cloud server from the address server through an HTTP GET message carrying an account name.

The address of the cloud server may be an IP (Internet Protocol, Internet protocol) address and a Port (port number).

[12] The address server queries whether itself is recorded with the address of the cloud server corresponding to the account name, and if not, provides, according to a load condition of each cloud server, an address of a cloud server to the browser plug-in on the PC.

Specifically, the address server returns to the browser plug-in on the PC an HTTP 200 OK message carrying the address of the cloud server, or, the address server returns to the browser plug-in on the PC an HTTP 500 or 503 message indicating that the address fails to be obtained.

Furthermore, after providing the address of the cloud server, the address server records the account name and the address of the cloud server corresponding to the account name.

[13] The browser plug-in on the PC send a login message to the cloud server corresponding to the address through an HTTP POST message carrying the account name and an account password.

It should be noted that the HTTP message includes two parts: an HTTP message header and an HTTP message body. The HTTP message header is processed according to an HTTP protocol, which is not described here. In the following only the HTTP message body is introduced and the HTTP message body can be described by using an XML (Extensible Markup Language, extensible markup language).

A reference format of the login message sent by the browser plug-in on the PC is as follows:

```
<?xml version="1.0" encoding="UTF-8"?>
<pc_login_req>
  <client>
    <account>liliang</account>
    <pwd>123456</pwd>
  </client>
</pc_login_req>
``` where the element account indicates an account name, and the element pwd indicates an account password. For example, the account name "liliang" and the password "123456" are used to perform login.

[14] The cloud server corresponding to the address authenticates the browser plug-in on the PC. If the authentication is successful, the cloud server returns an HTTP 200 OK message to the browser plug-in on the PC, and if the authentication fails, the cloud server returns an HTTP 401 or 500 or 503 message to the browser plug-in on the PC.

The HTTP 200 OK message indicating that the authentication is successful (that is, the login is successful) may have the HTTP message header only, and the HTTP message body is empty.

The indication that the authentication fails (that is, the login fails) includes the following three cases.

HTTP 401 message (Unauthorized): It indicates that the account name or the account password is incorrect, and the authentication fails.

HTTP 500 message (Internal Server Error): It indicates the cloud server has an internal exception and cannot provide a relevant capability.

HTTP 503 message (Service Unavailable): It indicates that the cloud server is currently in an overload state or is under maintenance, and cannot process a request message of a client.

[15] The browser on the mobile terminal requests to obtain the address of the cloud server from the address server through an HTTP GET message carrying an account name.

[16] The address server queries whether itself is recorded with the address of the cloud server corresponding to the account name, and if yes, sends the address of the cloud server corresponding to the account name (that is, the address of the cloud server same as that of the browser plug-in on the PC) to the browser on the mobile terminal.

Specifically, the address server sends to the browser on the mobile terminal an HTTP 200 OK message carrying the address of the cloud server, or, the address server sends to the browser on the mobile terminal an HTTP 500 or 503 message indicating that the address fails to be obtained.

[17] The browser on the mobile terminal sends to the cloud server corresponding to the address through an HTTP POST message a login message carrying the account name and an account password.

A reference format of the login message sent by the browser on the mobile terminal is as follows:

```
<?xml version="1.0" encoding="UTF-8"?>
<mobile_login_req>
<client>
<account>liliang</account>
<pwd>123456</pwd>
  </client>
</mobile_login_req>
``` where the element account indicates the account name, the element pwd indicates the account password. For example, the account name "liliang" and the password "123456" are used to perform login.

[18] The cloud server corresponding to the address authenticates the browser on the mobile terminal. If the authentication is successful, the cloud server returns an HTTP 200 OK message to the browser on the mobile terminal. If the authentication fails, the cloud server returns an HTTP 401 or 500 or 503 message to the browser on the mobile terminal.

Specifically, if the account name exists and the account name and the account password match, the authentication is successful, and otherwise the authentication fails.

In a second case, the browser on the mobile terminal first obtains the address of the cloud server from the address server, and logs in to the cloud server corresponding to the address, and then the browser plug-in on the PC obtains the address of the cloud server from the address server, and logs in to the cloud server corresponding to the address.

Figure 5:
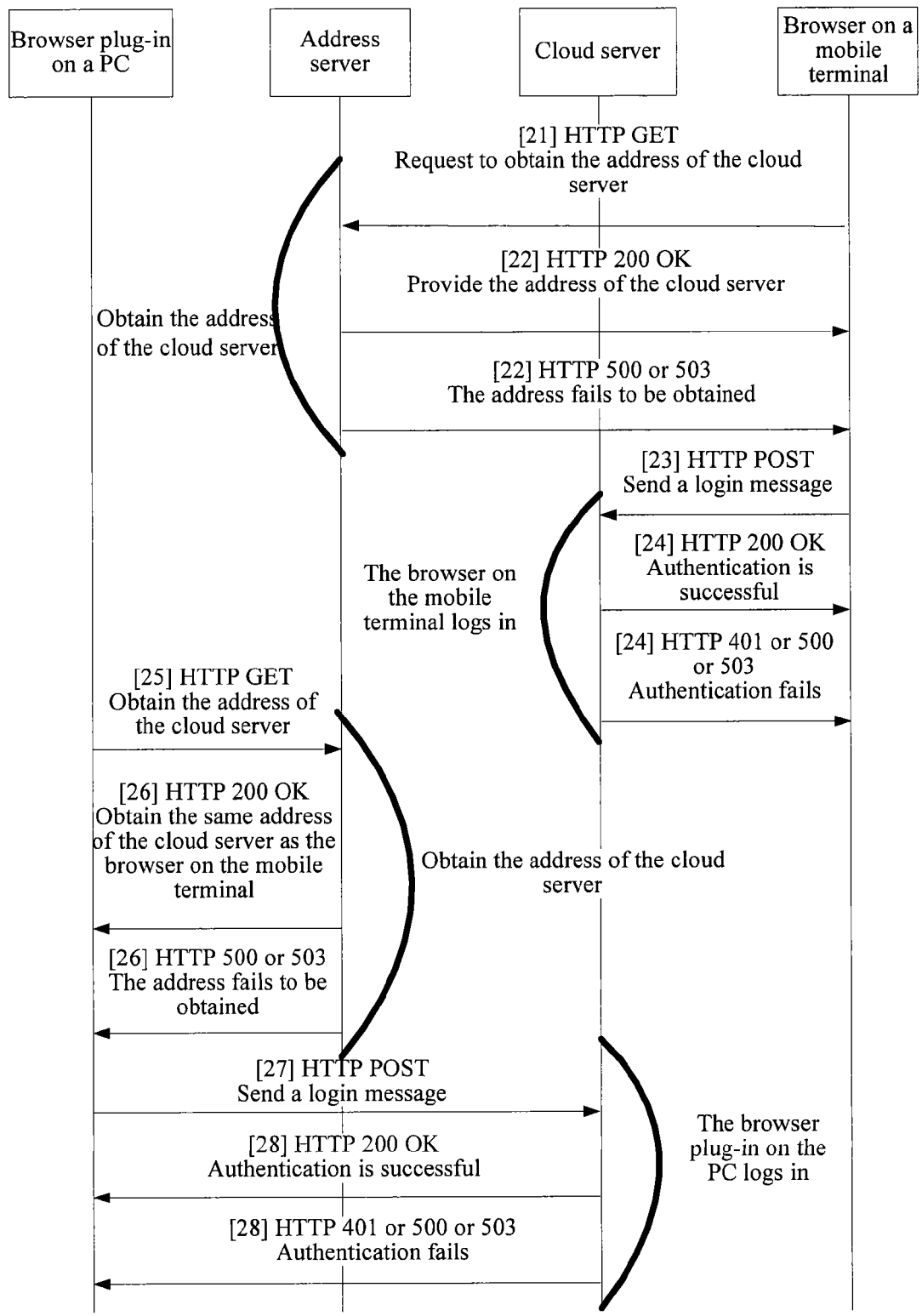
FIG. 5 is another information interaction diagram of logging in to a cloud server according to Embodiment 1 of the present invention.

Referring to FIG. 5, a specific procedure is as follows.

[21] The browser on the mobile terminal requests to obtain the address of the cloud server from the address server through an HTTP GET message carrying an account name.

[22] The address server queries whether itself is recorded with the address of the cloud server corresponding to the account name, and if not, provides, according to a load condition of each cloud server, an address of a cloud server to the browser on the mobile terminal.

Specifically, the address server returns to the browser on the mobile terminal an HTTP 200 OK message carrying the address of the cloud server, or, the address server returns to the browser on the mobile terminal an HTTP 500 or 503 message indicating that the address fails to be obtained.

Further, after the address server provides the address of the cloud server, the account name and the address of the cloud server corresponding to the account name are recorded.

[23] The browser on the mobile terminal sends a login message carrying the account name and an account password to the cloud server corresponding to the address through an HTTP POST message.

[24] The cloud server corresponding to the address authenticates the browser on the mobile terminal, if the authentication is successful, the cloud server returns to the browser on the mobile terminal an HTTP 200 OK message, and if the authentication fails, the cloud server returns to the browser on the mobile terminal an HTTP 401 or 500 or 503 message.

Specifically, if the account name exists and the account name and the account password match, the authentication is successful, and otherwise the authentication fails.

[25] The browser plug-in on the PC requests to obtain the address of the cloud server from the address server through an HTTP GET message carrying an account name.

[26] The address server queries whether itself is recorded with the address of the cloud server corresponding to the account name, and if yes, sends the address of the cloud server corresponding to the account name (that is, the address of the cloud server same as that of the browser on the mobile terminal) to the browser plug-in on the PC.

Specifically, the address server sends to the browser plug-in on the PC an HTTP 200 OK message carrying the address of the cloud server, or, the address server sends to the browser plug-in on the PC an HTTP 500 or 503 message indicating that the address fails to be obtained.

[27] The browser plug-in on the PC sends a login message carrying the account name and the account password to the cloud server corresponding to the address through an HTTP POST message.

[28] The cloud server corresponding to the address authenticates the browser plug-in on the PC, if the authentication is successful, the cloud server returns an HTTP 200 OK message to the browser plug-in on the PC, and if the authentication fails, the cloud server returns an HTTP 401 or 500 or 503 message to the browser plug-in on the PC.

Specifically, if the account name exists and the account name and the account password match, the authentication is successful, and otherwise the authentication fails.

It should be noted that, the browser on the mobile terminal provides an on/off button of a cloud transmission service, and a user can dynamically turns on and off the cloud transmission service through the on/off button. Turn-on function: Before the browser on the mobile terminal logs in to the cloud server, the browser on the mobile terminal turns on the cloud transmission service by the user and connects the cloud server. A procedure of connecting the cloud server may be: the browser on the mobile terminal may register a network state switching receiver to detect a change of a network state; if a network is unavailable, turn off a persistent HTTP connection with the cloud server and notify the user; and if the network is available, the browser on the mobile terminal first creates a subthread to complete relevant work of connecting the cloud server, if the connection fails, retries within a preset time or preset times, and if both fail, turns off the service automatically. A time interval of connection retry may be changed. For example, if the first connection fails, a maximum number of retires at an interval of 1 second is 2, and if the connection to the server still fails, the maximum number of retries at an interval of 3 seconds is 2, and if all the 5 times of connection to the server fail, the service is turned off automatically. Turn-off function: The browser on the mobile terminal first exits from the message monitoring subthread, then turns off the persistent HTTP connection with the cloud server and all timers, and finally unregister a screen state switching receiver and the network state switching receiver.

Further, after the browser plug-in on the PC and the browser on the mobile terminal log in to the cloud server successfully, the account may also be logged out. Specifically, the browser plug-in on the PC or the browser on the mobile terminal sends to the cloud server a logout message carrying an account name. If the browser plug-in on the PC logs out of the account, the cloud server deletes a message cache of the account. If the browser on the mobile terminal logs out of the account, the persistent HTTP connection between the cloud server and the mobile terminal is first actively turned off and then a link cache of the account is deleted.

A logout message body of the browser plug-in on the PC is as follows:

```
<?xml version="1.0" encoding="UTF-8"?>
<pc_logout_req>
<client>
```

```
        <account>liliang</account>
    </client>
</pc_logout_req>
``` where the element account indicates an account name.

A logout message body of the browser on the mobile terminal is as follows:

```
<?xml version="1.0" encoding="UTF-8"?>
<mobile_logout_req>
    <client>
        <account>liliang</account>
    </client>
</mobile_logout_req>
``` where the element account indicates an account name.

102: After successfully logging in to the cloud server, the browser plug-in on the PC sends a message content record of the user to the cloud server.

Figure 3A:
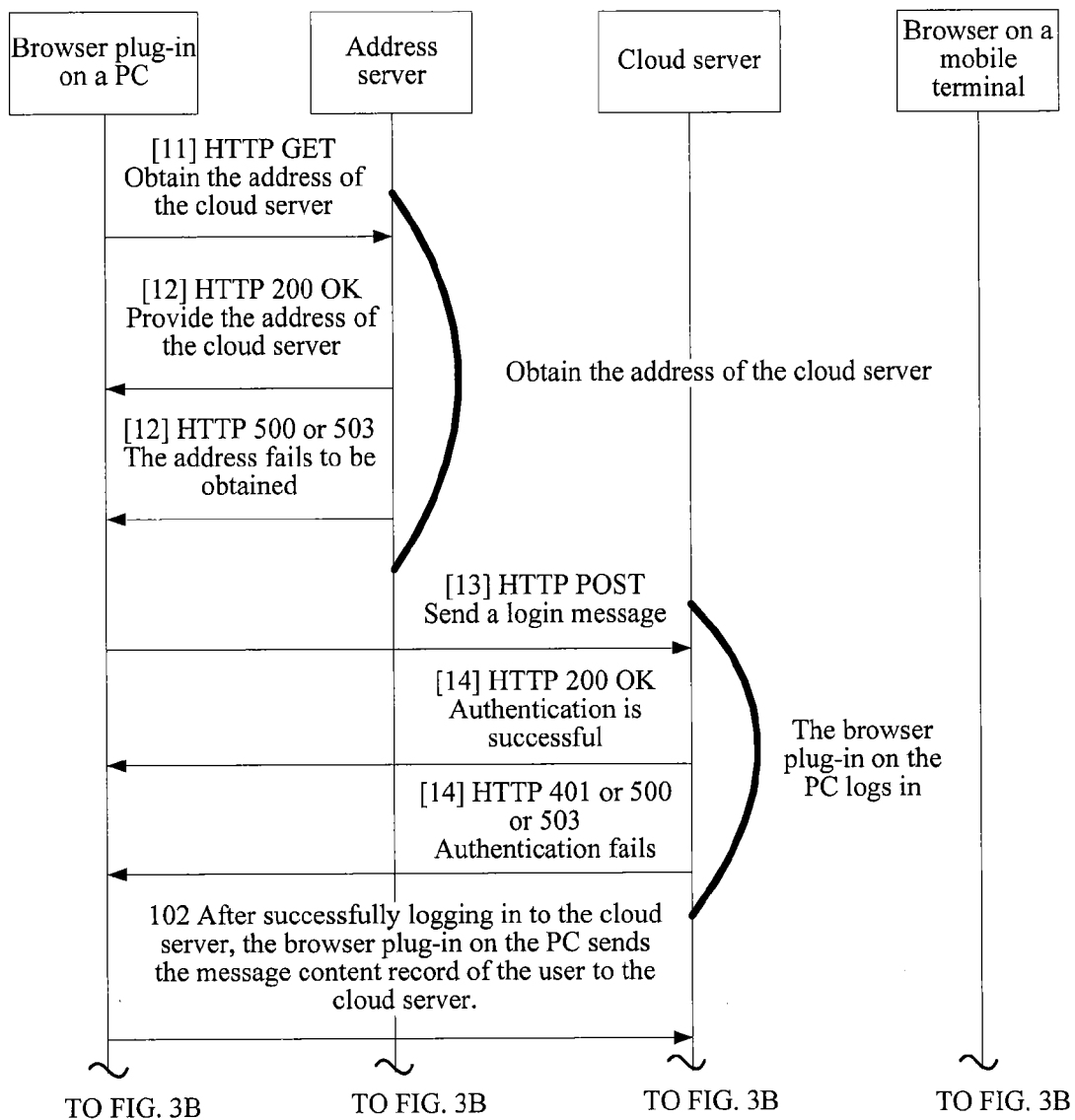
FIGS. 3A and 3B is an information interaction diagram of an information transmission method based on the login method in FIG. 2.
Figure 3B:
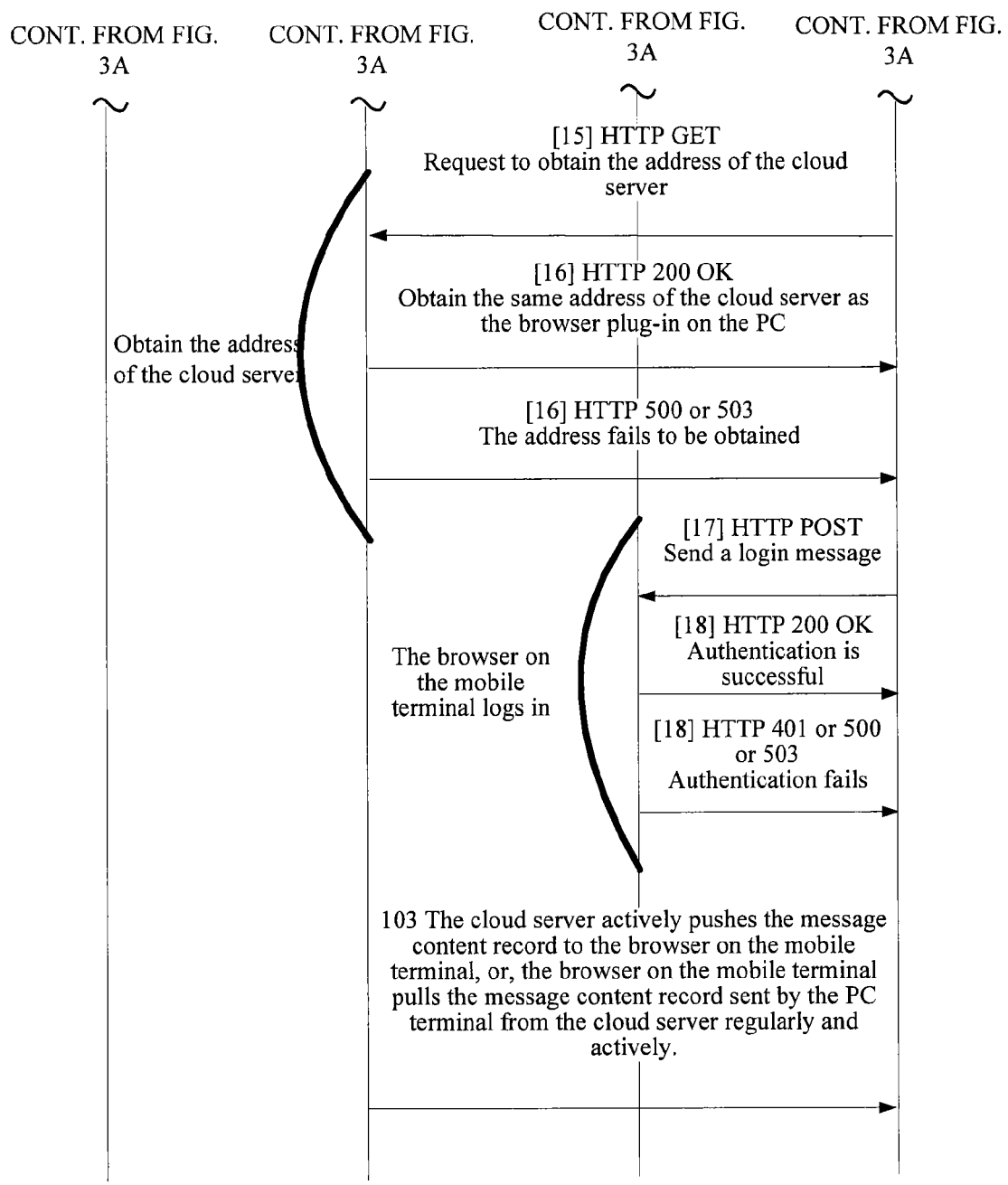
Figure 4A:
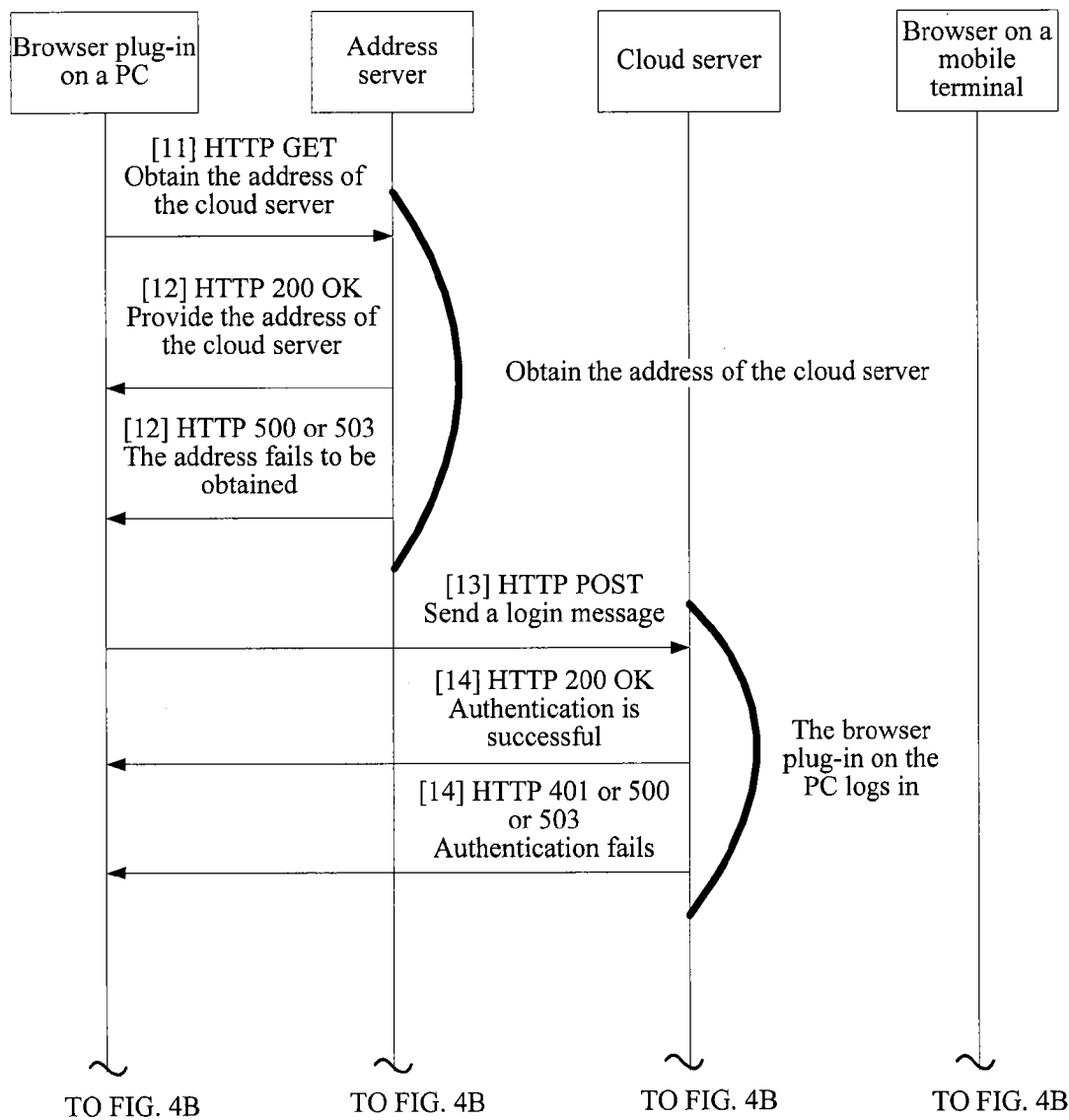
FIGS. 4A and 4B is an information interaction diagram of another information transmission method based on the login method in FIG. 2.
Figure 4B:
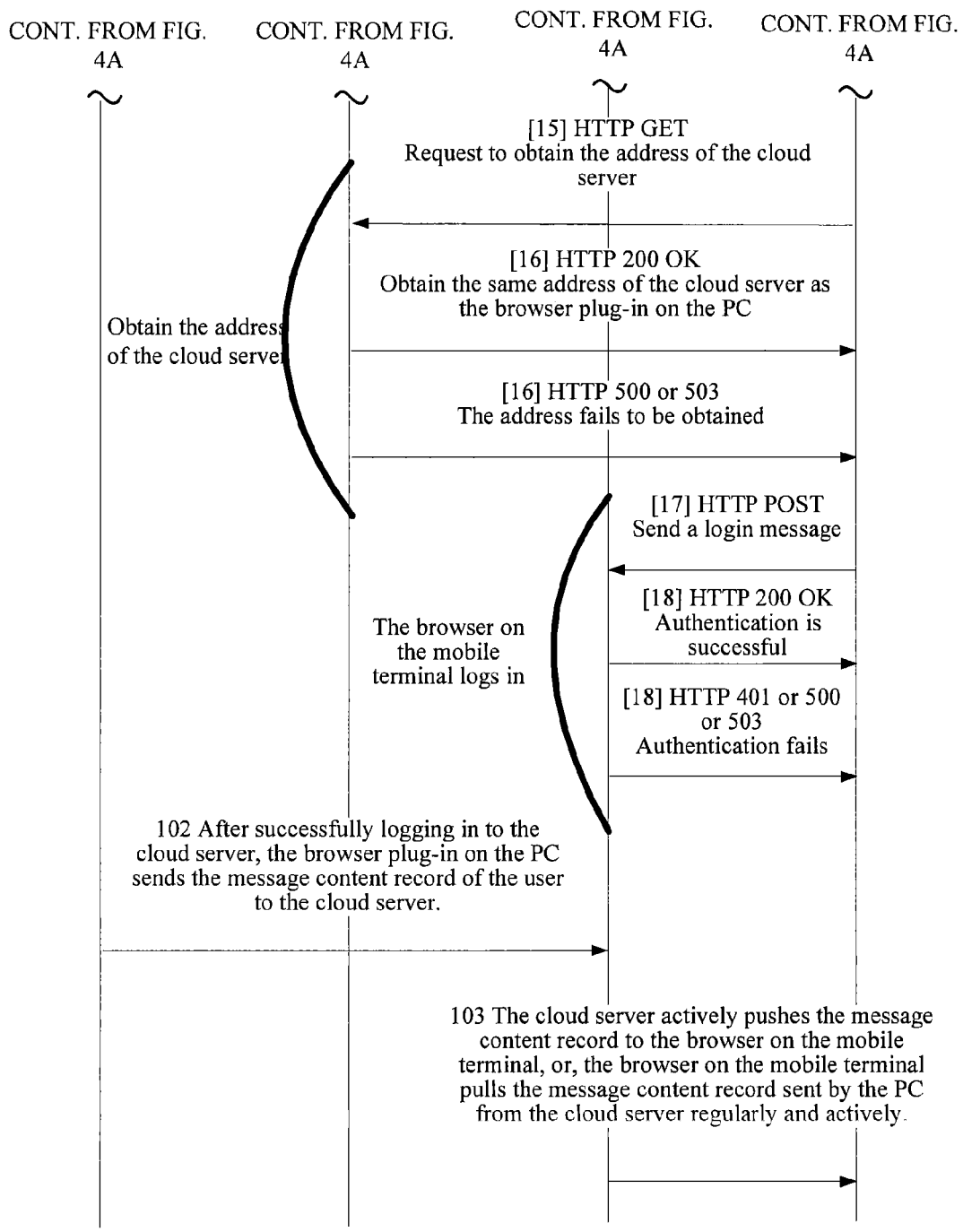

It should be noted that the step that the browser plug-in on the PC sends message content of the user to the cloud server may be performed before or after the browser on the mobile terminal obtains the address of the cloud server and logs in to the cloud server. Specifically, in the case shown in FIGS. 2A and 2B that the browser plug-in on the PC logs in first, for the step that the browser plug-in on the PC sends the message content of the user to the cloud server, an information transmission procedure before the browser on the mobile terminal obtains the address of the cloud server and logs in to the cloud server is as shown in FIGS. 3A and 3B, and an information transmission procedure after the browser on the mobile terminal obtains the address of the cloud server and logs in to the cloud server is as shown in FIGS. 4A and 4B.

The message content record includes an account name, a message type, message content, and so on. A structure of reference data of the message content record is as follows:

TABLE 1

Message Content Record

Account Name (Primary Key)    Message Type    Message Content
Account name Range: for example, {0, 1, 4, 5}
1) 0: undefined;
2) 1: URL;
3) 4: telephone number;
4) 5: plain text.

Note:
According to a requirement, a message type may be added. (Other types such as mail, bookmark)/URL/telephone number/text It should be noted that, the message content includes Internet information such as a URL, a plain text, and a telephone number, and includes important information on a PC browser such as a bookmark saved by the user.

A sending reference format of the message content record is as follows:

```
<?xml version="1.0" encoding="UTF-8"?>
<pc_to_phone>
    <account>15950589948</account>
    <msg>
        <msg_type>1</msg_type>
        <msg_content>
        http://hiphotos.baidu.com/836731212/pic/item/
        dbc598c0a0aeb78238db4909.jpg
        </msg_content>
```
    </msg>
</pc_to_phone>
``` where the element account indicates an account name, the element msg_type indicates a message type, and the element msg_content indicates message content. For example, the account name is "15950589948", the message type is 1, namely, a URL, the message content is a URL link http://hiphotos.baidu.com/836731212/pic/item/dbc598c0a0aeb78238db4909.

Further, upon receiving the message content record sent by the browser plug-in on the PC, the cloud server first matches the account name, if the account name is valid, stores the message content record with the account name as a primary key, and if the account name is invalid, returns an error response message. In addition, the cloud server may only store one latest received message content record of each message type for each account name.

103: After the browser on the mobile terminal successfully logs in to the cloud server, the cloud server actively pushes the message content record to the browser on the mobile terminal through the persistent HTTP connection with the mobile terminal, or, the browser on the mobile terminal pulls the message content record sent by the PC terminal from the cloud server regularly and actively.

A case of actively pushing the message content specifically includes the following steps.

[31] Establish a persistent connection. When the browser on the mobile terminal successfully logs in to the cloud server, the cloud server assigns a persistent connection pointer to the mobile terminal, so the persistent HTTP connection between the cloud server and the mobile terminal is established. The cloud server may store a link information record which uses the account name as a primary key, and its structure of reference data is as shown in Table 2, where the structure includes an account name, a state of the mobile terminal, link information, and so on. The cloud server may obtain the state of the mobile terminal through a heartbeat request message sent by the mobile terminal, and the mobile terminal may register a screen state switching receiver to receive in real time a switching state of a screen of the mobile terminal being turned on or off. When the state of the mobile terminal changes, the cloud server is notified through the heartbeat request message. The link information records a persistent connection pointer.

TABLE 2

Link information Record

Account Name (Primary Key)    State of Mobile Terminal    Link
Account Name Range: for example, [0..1]
1) 1: The screen of the mobile terminal is turned on, and the mobile terminal is in an active state;
2) 0: The screen of the mobile terminal is turned off, and the mobile terminal is in an idle state.
Default value: 1 A persistent connection pointer between the cloud server and the mobile terminal.
Default value: NULL (null)

[32] Maintain the persistent connection. The cloud server and the mobile terminal maintain the persistent HTTP connection through a heartbeat mechanism, that is, the mobile terminal regularly sends to the cloud server a heartbeat request message carrying information such as the account name and the state of the mobile terminal, for example, a heartbeat period is 6 minutes, and receives a heartbeat response message returned by the cloud server. If the heartbeat response message returned by the cloud server is received within a preset time (for example, within 20 seconds), the persistent HTTP connection between the cloud server and the mobile terminal is normal. If the heartbeat response message returned by the cloud server is not received within a preset time, the persistent HTTP connection between the cloud server and the mobile terminal is turned off abnormally. When the persistent HTTP connection is turned off abnormally, the mobile terminal may initiate a connection request again, and establish a new persistent HTTP connection with the cloud server.

A reference format of the heartbeat request message is as follows:

```
<?xml version="1.0" encoding="UTF-8"?>
<heartbeat_req>
    <account>liliang</account>
    <client>
        <state>1</state>
    </client>
</heartbeat_req>
``` where the element account indicates an account name, the element state indicates a state of a mobile terminal, the value of the element state being 1 indicates that the screen of the mobile terminal is turned on and the mobile terminal is in the active state, and the value of the element state being 0 indicates that the screen of the mobile terminal is turned off and the mobile terminal is in the idle state. For example, when the account name of the mobile terminal is "liliang" and the state is 1, it indicates that currently the screen of the mobile terminal is on and the mobile terminal is in the active state.

The heartbeat response message may be an HTTP 200 OK message, and its message body is empty.

[33] The cloud server actively pushes the message content. Upon receiving and caching the message content record sent by the browser plug-in on the PC, the cloud server detects the state of the mobile terminal; if the mobile terminal is in the active state, actively pushes the stored message content record to the mobile terminal at once; and otherwise, the cloud server delays sending and waits until the mobile terminal is switched to the active state, and then pushes the latest message content record to the mobile terminal. A active pushing procedure includes the following three cases.

1) If the cloud server already caches a message content record having the same account name before the mobile terminal logs in to the cloud server, the cloud server sends the message content record as a login response message body to the mobile terminal.

2) If the cloud server already caches a message content record having the same account name before the mobile terminal sends the heartbeat request message, the cloud server sends the message content record as the heartbeat response message body to the mobile terminal.

3) If the browser plug-in on the PC sends multiple messages of the same type to the cloud server before the mobile terminal starts the cloud transmission service or during the idle state, after the mobile terminal starts the cloud transmission service or the active state, the cloud server only pushes one latest message of each message type to the mobile terminal.

A push reference format of the message content record is as follows:

```
<?xml version="1.0" encoding="UTF-8"?>
<push>
```

```
<msg>
    <msg_type>1</msg_type>
    <msg_content>
    http://hiphotos.baidu.com/836731212/pic/item/
    dbc598c0a0aeb78238db4909.jpg
    </msg_content>
</msg>
</push>
``` where the element msg_type indicates a message type, and the element msg_content indicates a message content. For example, the message type is 1, that is, a URL type, and the message content record whose message content is a URL link http://hiphotos.baidu.com/836731212/pic/item/dbc598c0a0aeb78238db4909.jpg is actively pushed to the mobile terminal.

[34] The browser on the mobile terminal starts the message monitoring subthread and monitors and processes in real time the message content record actively pushed by the cloud server. Specifically, the message content record is monitored and received in real time, the message content record is parsed, the user is notified, and corresponding processing is performed according to the message type. For example, for a URL type message, the browser may be automatically invoked to open the link and display a webpage, picture or video. For a telephone number type message, a dialer may be started. For a text type message, text content may be saved in a clipboard.

In this embodiment, the browser plug-in on the personal computer and the browser on the mobile terminal respectively obtain the address of the cloud server from the address server, and log in to the cloud server corresponding to the address, and after successfully logging in to the cloud server, the browser plug-in on the personal computer sends the message content record of the user to the cloud server, and after the browser on the mobile terminal logs in to the cloud server successfully, the cloud server actively pushes the message content record to the browser on the mobile terminal through the persistent HTTP connection with the browser on the mobile terminal, or, the browser on the mobile terminal pulls the message content record from the cloud server regularly and actively. The entire information transmission procedure does not require cooperation of an operator and a process having a specific function to be embedded, so the information transmission procedure is simplified. Also, this embodiment is applicable to various types of mobile terminals and various mainstream browsers and is not limited by the terminal types and browsers, and has high openness; content of the information transmission is rich, in addition to the Internet information such as a URL, plain text and telephone number, important information of a personal computer browser such as the bookmark saved by the user may also be transmitted; and the user can interact with the browser on the mobile terminal and dynamically turn on and off the cloud transmission service, so user experience is good and flexibility is high.

Embodiment 2

Figure 6:
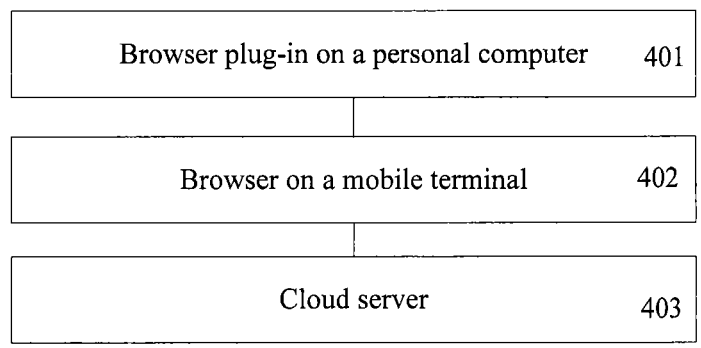
FIG. 6 is a schematic diagram of an information transmission system according to Embodiment 2 of the present invention.

Referring to FIG. 6, this embodiment provides an information transmission system, where the system includes: a browser plug-in on a personal computer 401, a browser on a mobile terminal 402, and a cloud server 403.

The browser plug-in on the personal computer 401 and the browser on the mobile terminal 402 respectively obtain an address of the cloud server 403 from an address server, and log in to the cloud server 403 corresponding to the address.

After successfully logging in to the cloud server 403, the browser plug-in on the personal computer 401 sends a message content record of a user to the cloud server 403.

After the browser on the mobile terminal 402 successfully logs in to the cloud server 403, the cloud server 403 actively pushes the message content record to the browser on the mobile terminal 402 through a persistent HTTP connection with the browser on the mobile terminal 402, or, the browser on the mobile terminal 402 pulls the message content record from the cloud server 403 regularly and actively.

When actively pushing the message content record to the browser on the mobile terminal 402, the cloud server 403 is specifically configured to detect a state of the mobile terminal after the cloud server 403 receives the message content record sent by the browser plug-in on the personal computer 401; if the mobile terminal is in an active state, actively pushes the message content record to the mobile terminal at once; and if the mobile terminal is in an idle state, the cloud server 403 caches the message content record sent by the browser plug-in on the personal computer 401, and waits until the mobile terminal is switched to the active state and pushes the latest message content record to the mobile terminal.

The cloud server 403 and the browser on the mobile terminal 402 maintain the persistent HTTP connection through a heartbeat mechanism.

The browser on the mobile terminal 402 provides an on/off button of a cloud transmission service, so that the user dynamically turns on and off the cloud transmission service by using the on/off button.

The browser on the mobile terminal 402 monitors and processes the message content record from the cloud server 403 in real time through the persistent HTTP connection.

The message content record includes Internet information or information of a personal computer browser.

In this embodiment, the browser plug-in on the personal computer and the browser on the mobile terminal respectively obtain the address of the cloud server from the address server, and log in to the cloud server corresponding to the address, and after successfully logging in to the cloud server, the browser plug-in on the personal computer sends the message content record of the user to the cloud server, and after the browser on the mobile terminal logs in to the cloud server successfully, the cloud server actively pushes the message content record to the browser on the mobile terminal through the persistent HTTP connection with the browser on the mobile terminal, or, the browser on the mobile terminal pulls the message content record from the cloud server regularly and actively. An entire information transmission procedure does not require cooperation of an operator and a process having a specific function to be embedded, so the information transmission procedure is simplified. Also, this embodiment is applicable to various types of mobile terminals and various mainstream browsers and is not limited by the terminal types and browsers, and has high openness; content of the information transmission is rich, in addition to the Internet information such as a URL, plain text and telephone number, important information of a personal computer browser such as a bookmark saved by the user may also be transmitted; and the user may interact with the browser on the mobile terminal and dynamically turn on and off the cloud transmission service, so user experience is good and flexibility is high.

Embodiment 3

Figure 7:
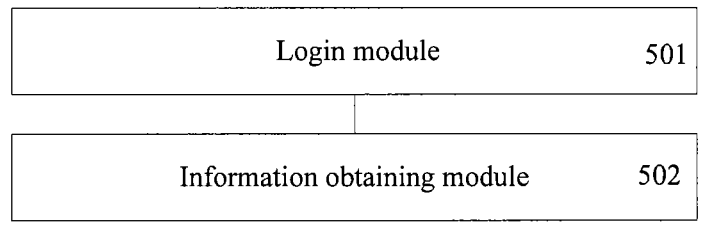
FIG. 7 is a schematic diagram of a browser on a mobile terminal according to Embodiment 3 of the present invention.

Referring to FIG. 7, this embodiment provides a browser on a mobile terminal, where the browser includes:

a login module 501, configured to obtain an address of a cloud server from an address server, and log in to the cloud server corresponding to the address; and an information obtaining module 502, configured to receive in real time, after successfully logging in to the cloud server, through a persistent HTTP connection with the cloud server, a message content record which is sent by a browser plug-in on a personal computer and is actively pushed by the cloud server, or, pull the message content record from the cloud server regularly and actively.

The browser further includes: a connection maintenance module, configured to maintain the persistent HTTP connection with the cloud server through a heartbeat mechanism.

The browser further includes: a service providing module, configured to provide an on/off button of a cloud transmission service, so that a user dynamically turns on and off the cloud transmission service by using the on/off button.

The message content record includes Internet information or information of a personal computer browser.

In this embodiment, the browser obtains the address of the cloud server from the address server and logs in to the cloud server corresponding to the address, and receives in real time through the persistent HTTP connection with the cloud server the message content record which is sent by the browser plug-in on the personal computer and is actively pushed by the cloud server, or, pulls the message content record from the cloud server regularly and actively. An entire information transmission procedure does not require cooperation of an operator and a process having a specific function to be embedded, so the information transmission procedure is simplified. Also, this embodiment is applicable to various types of mobile terminals and various mainstream browsers and is not limited by the terminal types and browsers, and has high openness; content of the information transmission is rich, in addition to the Internet information such as a URL, plain text and telephone number, important information of a personal computer browser such as a bookmark saved by the user may also be transmitted; and the user may interact with the browser on the mobile terminal and dynamically turn on and off the cloud transmission service, so user experience is good and flexibility is high.

People of ordinary skill in the art may understand that all or part of the steps according to the foregoing embodiments may be implemented by hardware or a program instructing relevant hardware. The program may be stored in a computer readable storage medium. The storage medium may be a read-only memory, a magnetic disk, or a compact disk, and so on.

The foregoing are only exemplary embodiments of the present invention. It should be pointed out that, for persons of ordinary skill in the art, some modifications and variations may be made without departing from the principle of the present invention, where the modifications and variations should be construed as falling within the scope of the present invention.

What is claimed is:

1. An information transmission method for a first browser plug-in on a personal computer and a second browser plug-in on a mobile terminal, the method comprising:

executing by the first and second browser plug-ins a procedure for information transmission with a cloud server by:

executing, by the first browser plug-in on the personal computer, a process of serving as a client to the cloud server for information transmission to the cloud server by obtaining an address of the cloud server from an address server, and logging in, by the first browser plug-in on the personal computer, to the cloud server;

executing, by the second browser plug-in on the mobile terminal, a process of serving as a client to the cloud server for information reception by obtaining address of the cloud server obtained by the first browser plug-in on the personal computer, and logging in, by the second browser plug-in on the mobile terminal, to the cloud server;

transmitting to the cloud server, by the first browser plug-in on the personal computer after logging in to the cloud server, a message content record of a user obtained by the first browser plug-in on the personal computer; and pushing to the mobile terminal, by the cloud server, after the second browser plug-in on the mobile terminal logs in to the cloud server, through a persistent HTTP connection with the logged in second browser plug-in on the mobile terminal, the message content record transmitted to the cloud server by the first browser plug-in on the personal computer, or pulling from the cloud server, by the logged in second browser plug-in on the mobile terminal, the message content record transmitted to the cloud server by the first browser plug-in on the personal computer.

2. The method according to claim 1, wherein the pushing, by the cloud server, the message content record to the logged in second browser plug-in on the mobile terminal comprises:

detecting, by the cloud server, after receiving the message content record transmitted by the first browser plug-in on the personal computer, a state of the mobile terminal;

if the mobile terminal is in an active state, pushing the message content record to the mobile terminal at once; and if the mobile terminal is in an idle state, caching, by the cloud server, the message content record transmitted by the first browser plug-in on the personal computer, and waiting until the mobile terminal is switched to the active state and pushing a latest message content record to the mobile terminal.

3. The method according to claim 1, further comprising: maintaining, by the cloud server and the second browser plug-in on the mobile terminal, the persistent HTTP connection through a heartbeat mechanism.

4. The method according to claim 1, further comprising: providing, by the second browser plug-in on the mobile terminal, an on/off button of a cloud transmission service for the information transmission with the cloud server, enabling a user to turn on and off the cloud transmission service by using the on/off button.

5. The method according to claim 1, further comprising: monitoring and processing, by the second browser plug-in on the mobile terminal, the message content record from the cloud server through the persistent HTTP connection.

6. The method according to claim 1, wherein the message content record comprises Internet information or information of a browser of the personal computer.

7. An information transmission system, comprising:
a personal computer configured with an executable browser plug-in, a mobile terminal configured with an executable browser plug-in, and a cloud server,
wherein
the personal computer is configured to, by using the browser plug-in, obtain an address of the cloud server from an address server, and log in to the cloud server corresponding to the address of the cloud server;
the mobile terminal is configured to, by using the browser plug-in, obtain an address of the cloud server from an address server, and log in to the cloud server corresponding to the address of the cloud server;
the personal computer is configured to, by using the browser plug-in, send a message content record of a user obtained by the browser plug-in on the personal computer to the cloud server after logging in to the cloud server; and the cloud server is configured to push the message content record sent to the cloud server by the browser plug-in on the personal computer to the browser on the mobile terminal through a persistent HTTP connection with the browser on the mobile terminal after the browser on the mobile terminal successfully logs in to the cloud server, or the browser on the mobile terminal is configured to pull the message content record sent to the cloud server by the browser plug-in on the personal computer from the cloud server.

8. The system according to claim 7, wherein the cloud server, when pushing the message content record to the browser plug-in on the mobile terminal, is configured to:
detect, after the cloud server receives the message content record sent by the browser plug-in on the personal computer, a state of the mobile terminal;
if the mobile terminal is in an active state, push the message content record to the mobile terminal at once; and
if the mobile terminal is in an idle state, cache the message content record sent by the browser plug-in on the personal computer, and wait until the mobile terminal is switched to the active state and push a latest new message content record to the mobile terminal.

9. The system according to claim 7, wherein the cloud server and the browser plug-in on the mobile terminal maintain the persistent HTTP connection through a heartbeat mechanism.

10. The system according to claim 7, wherein the browser plug-in on the mobile terminal provides an on/off button of a cloud transmission service for the information transmission with the cloud server, enabling a user to turn on and off the cloud transmission service by using the on/off button.

11. The system according to claim 7, wherein the browser plug-in on the mobile terminal monitors and processes the message content record from the cloud server in through the persistent HTTP connection.

12. The system according to claim 7, wherein the message content record comprises Internet information or information of a browser of the personal computer.

13. A computer system for an information transmission service implemented on a personal computer capable of executing a browser on the personal computer, a mobile terminal capable of executing a browser on the mobile terminal and a cloud server, the computer system comprising:
a first browser plug-in for the browser on the personal computer and a second browser plug-in for the browser on the mobile terminal, wherein:
the first browser plug-in on the personal computer is configured to execute a process of serving as a client to the cloud server for information transmission to the cloud server by obtaining an address of the cloud server from an address server, and log in to the cloud server;
the second browser plug-in on the mobile terminal is configured to execute a process of serving as a client to the cloud server for information reception by obtaining address of the cloud server obtained by the first browser plug-in on the personal computer, and log in to the cloud server;
the first browser plug-in on the personal computer is configured to transmit to the cloud server after logging in to the cloud server, a message content record of a user obtained by the first browser plug-in on the personal computer; and
the cloud server is configured to push to the mobile terminal after the second browser plug-in on the mobile terminal logs in to the cloud server, through a persistent HTTP connection with the logged in second browser plug-in on the mobile terminal, the message content record transmitted to the cloud server by the first browser plug-in on the personal computer; or the second browser plug-in on the mobile terminal is configured to pull from the cloud server, the message content record transmitted to the cloud server by the first browser plug-in on the personal computer.

14. The system according to claim 13, wherein the cloud server is configured to detect, after the cloud server receives the message content record transmitted by the first browser plug-in on the personal computer, a state of the mobile terminal, and the cloud server is further configured to push the message content record to the mobile terminal at once if the mobile terminal is in an active state, and cache the message content record transmitted by the first browser plug-in on the personal computer if the mobile terminal is in an idle state, and wait to push a latest new message content record to the mobile terminal until the mobile terminal is switched to the active state.

15. The system according to claim 13, wherein the second browser plug-in on the mobile terminal provides an on/off button of the information transmission service with the cloud server, enabling a user to turn on and off the cloud transmission service by using the on/off button.

16. The system according to claim 13, wherein the message content record comprises Internet information or information of the personal computer browser.

* * * * *